United States

Wefers et al.

[11] 3,920,959
[45] Nov. 18, 1975

[54] OPTO-ELECTRONIC SENSING ROD FOR THE MANUAL SCANNING OF GRAPHIC INFORMATION

[75] Inventors: Norbert Wefers, Wilhelmshaven; Uwe Unglaube; Joachim Schwarzkopf, both of Berlin, all of Germany

[73] Assignee: Nixdorf Computer AG, Paderborn, Germany

[22] Filed: Apr. 22, 1974

[21] Appl. No.: 463,040

[52] U.S. Cl. .......................... 235/61.11 E; 250/555
[51] Int. Cl.² ...................... G06K 7/10; G08C 9/06
[58] Field of Search ...... 235/61.11 F; 250/555, 566; 340/146.3 F

[56] References Cited
UNITED STATES PATENTS

| | | | |
|---|---|---|---|
| 3,727,030 | 4/1973 | McMurtry | 235/61.11 E |
| 3,735,142 | 5/1973 | Harr et al. | 235/61.11 E |
| 3,784,794 | 1/1974 | Allais | 235/61.11 E |

*Primary Examiner*—Daryl W. Cook
*Attorney, Agent, or Firm*—Woodhams, Blanchard and Flynn

[57] ABSTRACT

A sensing rod adapted to transmit light and receive reflected light and including circuitry adapted to detect variations in the intensity of the reflected light. A light transmitting and receiving tip is mounted on the sensing rod for axial movement relative thereto. Light conducting elements are provided for conducting the light detected from the axially movable tip to the aforementioned circuitry. The tip is resiliently urged into its outer projecting position from the front end of the sensing rod and is resiliently maintained in this position by a spring force which is adapted to yield when an external force is applied to the tip to permit the tip to move inside the sensing rod.

8 Claims, 2 Drawing Figures

OPTO-ELECTRONIC SENSING ROD FOR THE MANUAL SCANNING OF GRAPHIC INFORMATION

CROSS REFERENCE TO RELATED APPLICATION

This application is related to our copending application Ser. No. 463,042, filed Apr. 22, 1974.

FIELD OF THE INVENTION

The invention relates to an opto-electronic sensing rod for the manual scanning of graphic information having a tip which transmits light and receives light that is reflected from an information carrier, which tip is coupled through light-guiding elements with a light source and a photo-electronic structural element, and a plate bar which contains a signal-preparing circuit.

BACKGROUND OF THE INVENTION

A sensing rod of this type is guided manually over an information carrier which is provided with graphic information. The information can for example be applied in a bar-coded manner onto the information carrier. A particular use of this principle is the sensing of labels which are applied to goods and contain information concerning prices, storage numbers, type of goods, etc. The sensing pen is guided over such a label and illuminates thereby with its tip the information which can be evaluated by their different contrast values in the reflected light. The light which is reflected from the information is fed through the tip of the sensing rod to a photo-electronic structural element which is arranged in said sensing rod, which structural element emits electric signals corresponding with the different received light intensity values. A signal-preparing circuit which is provided in the sensing rod serves to compensate or rather reinforce the electric signals so that these can be transmitted to the actual sensing device which is associated with the sensing rod. Of course the information may be provided on the information carrier not only in the form of differently dimensioned wide bars, but in any other desired form, which is suitable for the opto-electronic evaluation.

The sensing operation is carried out advantageously with a sensing rod of the described type in such a manner that the tip of the sensing rod contacts the information carrier during the scanning movement. The sensing rod has thereby, due to the manual handling, mostly an angle of inclination relative to the information carrier in the order of magnitude of approximately 30° to the vertical. In order to assure an incidence-free sensing operation also during variations or extreme inclinations, the tip of the sensing rod must be constructed as much as possible like a sphere and must project at a certain degree from the structure of the sensing rod. On the other hand, however, the tip must be protected as much as possible with respect to mechanical effects, such as percussion and impact effects. Furthermore, the tip is to be wear resistant to assure an as large as possible number of sensing operations with a uniform exactness in the results.

In known opto-electronic sensing rods, light conducting elements, for example light conducting fiber bunches, are guided directly from the sensing rod and form its tip. This leads to an expensive construction because, in the case of a damage to the tip, the entire system of the light conducting elements must be repaired. Thus, an extensive use of the known opto-electronic sensing rods is not possible due to the expensiveness of the repairs.

Starting with the aforementioned problem, the basic purpose of the invention is to utilize a construction for a sensing rod, which is composed as much as possible of simple construction, high operation safety and which offers the greatest possible protection to the sensing rod tip. In addition, the sensing rod tip is alone easily exchangeable in case of damage or too great a use thereof without requiring the sensing rod itself to be disassembled.

SUMMARY OF THE INVENTION

A sensing rod of the above-mentioned type is adapted to attaining the aforementioned purpose in such a manner that the tip, the light conducting elements and a carrier for the light source and the photo-electronic structural element form a system which is movable relative to the plate bar upon the application of an external force action onto the tip of the sensing rod shaft, which system is held in a limiting position by spring force, in which position the tip projects from a front opening of the sensing rod shaft.

Since the movable system is moved only during an application of an external force action on the tip, it is possible to arrange the individual elements of this system without any mechanical side-by-side connection and to utilize the pressure force for effecting the movement, which pressure force occurs due to excessively large force actions on the tip. It is advantageous that an element which carries the tip be mechanically separated from the light conducting elements and is arranged only to abuttingly engage against the light conducting elements. Thus it is possible to easily exchange these elements, as desired. Damage to the sensing rod tip is reliably avoided by the automatic movement of the described system. When a force is applied onto the sensing rod tip, which force action is measured, depending on the adjusting of the spring force, said sensing rod tip disappears automatically in the sensing rod. If same is placed too strongly onto the information carrier or if it falls on the tip, then an automatic protection action occurs to prevent a destruction of the tip. Simultaneously in this construction a special advantage is achieved in that when damage to the sensing rod tip occurs in spite of the automatic protection action, the element carrying the tip can be readily exchanged. Through a separation of the tip from the light conducting elements which is possible in the principle of the invention, the light conducting elements do not also need to be exchanged so that all together substantially smaller repair expenses than in present sensing rods can be expected.

A sensing rod according to the invention can advantageously be constructed so that the movable system consists of a transparent, movable member which has the tip and a movable pipe which rests against said member and contains two light conducting elements, which pipe is fixedly connected to the carrier. Thus, the element which has the tip thereon is constructed as a uniform movable member which abuts the pipe containing the light conductors. Thus, the transparent member itself does not need to be formed of expensive light conducting fibers or similar elements, because it is sufficient if the light conductors are guided to it and the further light transmission to the sensing rod tip or from the sensing rod tip occurs through the transparent material. A rotationally symmetrical structure for this arrangement is possible if the movable member is a glass rod, preferably an image conductor or a fiber cone, which is centered in a metal sleeve, so that the metal sleeve is centered in a cap forming the front part of the sensing rod and the movable pipe is guided in a centering pipe which is secured in the sensing rod shaft and projects into the cap, which centering pipe is provided with an external thread for securing the cap. Thus the cap can be easily unscrewed from the centering pipe, through which the centering pipe, the therein movable pipe and the glass rod with its metal sleeve, which is arranged in front thereof, become accessible. Thus, the glass rod can easily be exchanged or can be inserted into the front-most part of the cap and same can again be screwed onto the centering pipe, which concludes the entire exchange operation for the sensing rod tip.

The spring force for holding the movable system in its front-most limiting position, in which the sensing rod tip projects from an opening of the cap, is advantageously realized in such a manner that between the front end of the centering pipe and the movable pipe there is arranged a helical spring which surrounds said movable pipe.

Of particular importance, in the construction according to the invention, is the perfect optic coupling of the element which carries the sensing rod tip to the actual light conductors. For this purpose, it is advantageous that the construction of the light conductors arranged in the movable pipe terminate at the end facing the transparent member in a ground and polished front surface of a connecting element which closes off the pipe and that the metal sleeve has an end bore which receives the connecting element and centers same. This automatically assures that during a screwing on of the cap, the metal sleeve is so to speak mounted onto the connecting element. Because it centers same, the ends of the light conductors which terminate together with the ground front surface of the connecting element, lie always in a perfectly centered position on the front surface of the transparent element, which is arranged in the metal sleeve, which front surface is positioned oppposite of them.

Further characteristics refer to the construction of the carrier for the light source and the photo-electronic structural element which can be constructed in one piece with the movable pipe. The complete movable system is thereby connected to the plate bar which contains the signal-preparing circuit through flexible wire-like connecting lines, which permit a large number of movements relative to the plate bar without creating a discontinuation or interruption of the connections. The limiting positions of the movement are determnied on one side by a stop in the sensing rod shaft, on the other side by a limited spring deflection of the described spring, so that also through this no structural difficulties are caused.

BRIEF DESCRIPTION OF THE DRAWING

One exemplary embodiment of a sensing rod according to the invention will be described hereinafter in connection with the drawing, in which.

DETAILED DESCRIPTION

Figure 1:
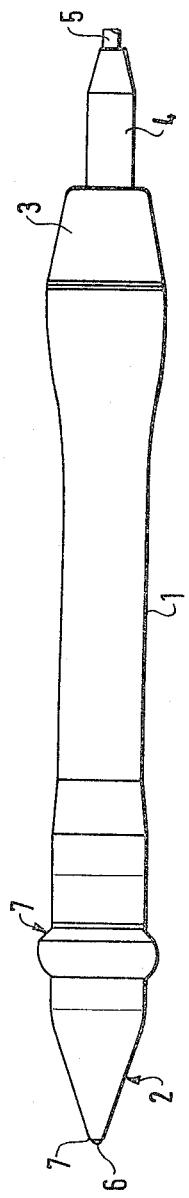
FIG. 1 is an outside illustration of an opto-electronic sensing rod.

FIG. 1 illustrates an opto-electronic sensing rod which consists substantially of an elongated rod 1, a front (left) end 2 and a rear (right) end cap 3. The front end 2 is constructed as a cover hood or cap and can be unscrewed from the end of the rod. An annular opening 7 in the cover hood or cap 2 serves to guide the sensing rod tip 6 therethrough, which sensing rod tip radiates light onto an information carrier and receives reflected light from same. In the rear cap 3, which is secured to the rear end of the rod 1 by screw threads, there is provided a guide sleeve 4 for a connecting cable 5 which connects the sensing rod to the actual sensing device. In a zone 7, which follows the cover hood 2, light-emitting sections can be provided which permit an optic signalling regarding a successful or faulty reading of information.

As can be seen from FIG. 1, the sensing rod is, with respect to its outer form, constructed as a rotationally symmetrical element, which can be disassembled by removing the front cover hood or cap 2 and the rear end cap 3.

Figure 2:
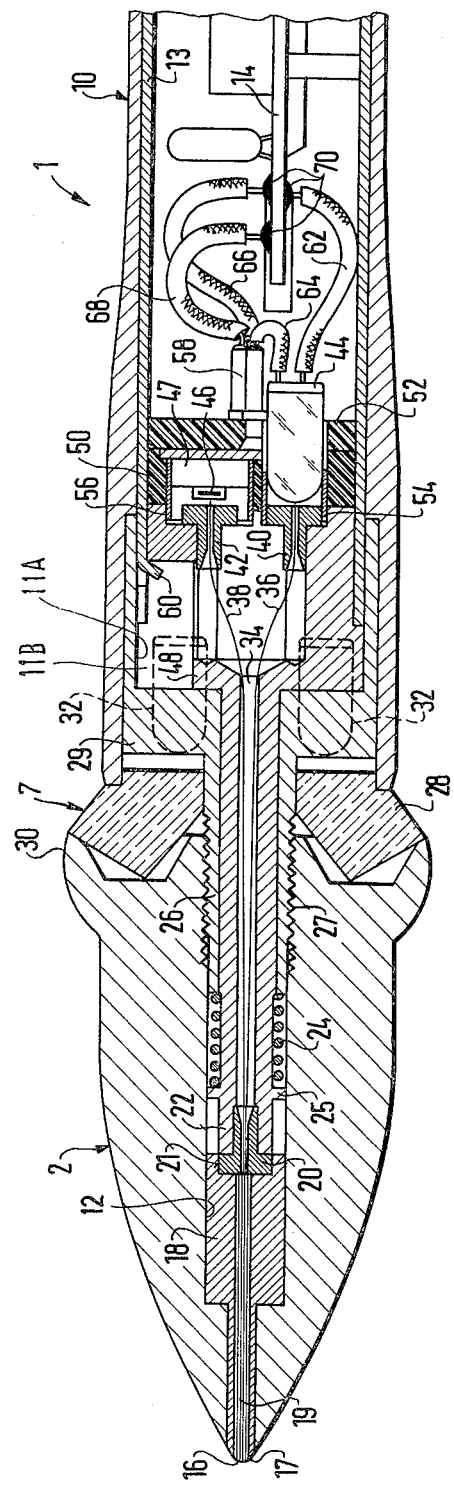
FIG. 2 is a longitudinal cross-sectional view of the front portion of the sensing rod illustrated in FIG. 1.

FIG. 2 illustrates, in a longitudinal cross-sectional view, the front half of the sensing rod and from this figure, the rotational symmetry of the structure of the sensing rod will be recognized. The sensing rod 1 has a hollow shaft 10 having a substantially uniform outer diameter and is closed off at the front end by the cover hood or cap 2. The cap 2 has an enlargement 30 for holding a transparent member 28 in the zone 7 which will be described below. The cap 2 has an opening 12 extending therethrough which opens outwardly at the front end at 17 and through which projects a tip 16 of a transparent member which transmits and receives light.

The cover hood or cap 2 can be screwed onto a centering pipe 26 by means of a thread 27. The centering pipe 26 is fixedly connected to the shaft 10 of the sensing rod 1 by any convenient means, as by gluing. For this purpose, the centering pipe 26 extends rearwardly of the cap 2 and has a radially outwardly extending flange at its rear end defining a holding member 29, the outer diameter of which corresponds to the inner diameter of the hollow sensing rod shaft 10. The holding member 29 is connected to the shaft 10 by any convenient means and has a rearwardly extending sleeve portion 11A defining a rearwardly opening chamber 11B. A fixedly mounted plate bar 14 mounted on the sensing rod shaft 10 carries circuit elements which define for example, a signal-preparing circuit. The signal preparing circuit is connected through flexible connecting lines 62, 64, 66 and 68 to the sensing system which is movable in the sensing rod, which system will be described hereinbelow.

The tip 16 of the sensing rod is composed of elongated rod-shaped transparent member 19, which consists, for example, of glass and is arranged in a hollow metal sleeve 18 having a centrally disposed, axially extending opening therethrough. The metal sleeve 18 serves to protect the glass member and defines a replaceable unit which is accessible, after unscrewing the cap 2 from the centering pipe 26 or it can be removed from the detached cap 2. In the arrangement illustrated in FIG. 2, the unit which consists of the transparent member 19 and metal sleeve 18 has mounted rearwardly thereof a connecting element 20, the front surface of which faces the sleeve 18 or the glass member 19. The front surface of the connecting element 20 is ground and polished. The connecting element 20 is maintained in a centered position in a rearwardly opening bore 21 in the metal sleeve 18, which bore 21 is dimensioned to correspond to the outer diameter of the connecting element 20. The connecting element 20 is secured to the front end of a hollow, axially movable pipe 22, the inner bore 34 of which serves to guide two light conducting fibers 36 and 38. The light conducting fibers 36 and 38 are connected at their front ends to the connecting element 20 at the center thereof and both terminate flush with the ground and polished front surface thereof. In this manner, a perfect optic coupling is achieved between the light conducting fibers 36 and 38 and the rod-shaped glass member 19 because of the centering of the connecting element 20 relative to the metal sleeve 18 which assures that the ends of the light conducting fibers 36 and 38 are always in an abutting and centered relation to the rear surface of the glass member 19. In place of a glass member 19, it is also possible to provide different arrangements, for example, an image conductor or a fiber cone. Such arrangements can be preferable to minimize optic losses.

The movable pipe 22 is guided for axial movement in the centering pipe 26 and is resiliently coupled to the centering pipe through a helical spring 24 encircling the pipe 22 and which abuts at one end radially extending flange 25 on the movable pipe 22 and at the other end the front end of the centering pipe 26. It will be recognized that during a pressure action onto the tip 16 of the sensing rod, a corresponding force action occurs onto the connecting element 20 so that the movable pipe 22 is moved in the centering pipe 26 against the force of the spring 24.

The movable pipe 22 terminates at its rear end in a carrier structure for a light source 44 and a photo-electronic structural element 46. The carrier structure is composed of a head 48 which is integral with the pipe 22 which has carrier plates 50 and 52 mounted on the rear surface of the head. The unit formed by these elements is axially movable with the pipe 22 within the chamber 11B which is formed by the holding member 29. A portion of the head 48 moves within an inner sleeve 13 mounted on the inside of the sensing rod shaft 10. The head 48 has a central recess therein through which the two light conducting fibers 36 and 38 extend and each terminate at one of the closing elements 40 and 42. The closing elements 40 and 42 each form at least one part of the front wall of a housing 54 or 56, in which the light source 44 or the photo- electronic structural element 46 is arranged. Both of the housings 54 and 56 have recesses in their front ends aligned with the central recess in the head 48 and are supported on the radial and on the back sides by the two carrier plates 50 and 52. The carrier plate 50 has bores therein which receive the two housings 54 and 56. The carrier plate 52 contains only those bores which receive the light sources 44. The flexible connecting lines 62, 64, 66 and 68 are connected to the light sources by means of a connecting member 58.

The system which is formed of the transparent member 19, the movable pipe 22 and the carrier consisting of the component parts 48, 50 and 52 can be moved in an axially longitudinal direction parallel to the axis of the sensing pen against the force of the helical spring 24, if a pressure action is applied on the tip 16. The tip 16 is moved rearwardly toward the plate bar 14 until the tip 16 disappears in the opening 17 of the cap 2. A limitation of this movement could occur furthermore by the limited spring deflection of the helical spring 24. The return movement produced by the helical spring 24 is limited by a stop 60 which is formed by a bent part of the inner shaft sleeve 13. In order to permit a rearward movement with respect to the stop 60, the head 48, which moves with the movable pipe 22, has in the zone of the stop 60 a corresponding axially extending recess.

The two light conducting fibers 36 and 38 are secured to the closing elements 40 and 42 in such a manner that they terminate flush with the rear surface of the respective closing element 40 or 42, which rear surface faces the light source 44 or the photo-electronic structural element. The distance of the light conducting fiber 36 from the light source 44 is not critical, while the distance of the light conducting fiber 38 from the photo-electronic structural element 46 is advantageously small in order to assure a high light output. For this purpose, the photo-electronic structural element 46 is arranged on a support 47, the thickness of which determines the distance from the end of the light conducting fiber 38.

The connecting lines 62, 64, 66 and 68 are connected to the plate bar 14 at soldered points 70. They consist of flexible wire which can withstand a very high number of bending operations without being damaged thereby.

The light source 44 is advantageously a miniature glow lamp which is inserted from the rear into the housing 54. Due to the fact that separate housings 54 and 56 are provided for the photo-electronic structural element 46 and the glow lamp 44, which housings are closed off at the forward end by the closing elements 40 and 42, a perfect optic insulation between both elements is achieved so that errors due to optical interactions are eliminated.

The rotationally symmetrical structure of the sensing rod 1 and the centering pipe-shaped elements in its center permit without any special expense an additional signalling device which can be utilized, for example, for characterizing a successful or also an incorrect sensing operation. For this purpose, an annular glass member 28 is arranged between the rear edge 30 of the cap 2 and the front edge of the outer shaft 10 of the sensing rod 1. The glass member 28 can be illuminated by a glow lamp 32, which is indicated by dashed lines in the cross-sectional illustration shown in FIG. 2, because the glow lamp can be arranged at any desired point on a ring which is parallel to the plate of the annular glass member 28. The glow lamp 32 can be energized from the sensing device which is connected through the aforementioned connecting cable 5 (FIG. 1), namely for example after a successful or also after an incorrect sensing operation. Thus, and through the special form of the glass member 28, its outer torus is then uniformly illuminated so that the operation which faces said torus obtains a signal reading.

The inexpensive additional signalling device can be provided because the described movable system requires in the front zone of the sensing rod extremely little space so that additional space is available for the signal elements.

The embodiments of the invention in which an exclusive property or privilege is claimed are defined as follows:

1. An opto-electronic sensing rod for the manual scanning of graphic information having a tip mounted in a sensing rod shaft and adapted to emit light and to receive light which is reflected from an information carrier, said tip being coupled through light conducting elements to a light source and a photo-electronic structural element, said opto-electronic sensing rod further having a plate bar which has a signal-preparing circuit mounted thereon, comprising the improvement wherein said tip, said light conducting elements and a carrier means for said light source and said photo-electronic structural element form a system which is movable relative to said plate bar through an application of a force onto said tip in said sensing rod shaft, resilient means for holding said system in a limiting position so that said tip projects from a front opening in said sensing rod shaft.

2. An opto-electronic sensing rod according to claim 1, wherein said movable system includes a transparent, movable member having said tip thereon and a movable pipe which abuts said member and contains two conducting fibers, said pipe being fixedly connected to said carrier means.

3. An opto-electronic sensing rod according to claim 2, wherein said movable member is an image conductor centered in a metal sleeve, said metal sleeve being centered in a cap forming a front part of the sensing rod and wherein said movable pipe is guided in a centering pipe secured in said sensing rod shaft and projects into said cap, said cap having an internal thread and said centering pipe having an external thread engaging said internal thread for securing said cap to said centering pipe.

4. An opto-electronic sensing rod according to claim 3, wherein said resilient means comprises a helical spring surrounding said movable pipe and positioned between the front end of said centering pipe and said movable pipe.

5. An opto-electronic sensing rod according to claim 3, wherein said light conductors arranged in said movable pipe at the end facing said transparent member terminate in a ground and polished front surface of a connecting element which closes off said movable pipe and wherein said metal sleeve has an end bore therein which receives said connecting element and centers same.

6. An opto-electronic sensing rod according to claim 1, wherein said carrier means comprises a piston member supported for movement in said sensing rod shaft and carries two housings for said light source and said photo-electronic structural element, said piston member and said movable pipe being of a one piece construction.

7. An opto-electronic sensing rod according to claim 6, wherein said light source and said photo-electronic structural element are connected to said plate bar through flexible, wirelike connecting lines.

8. An opto-electronic sensing rod according to claim 1, wherein said limiting position of said system is fixed by a stop on the inner wall of said sensing rod shaft, said stop extending into the zone of movement of said carrier means.

* * * * *